A. W. ERICKSON.
SPOUT.
APPLICATION FILED DEC. 20, 1911.
1,048,513.
Patented Dec. 31, 1912.
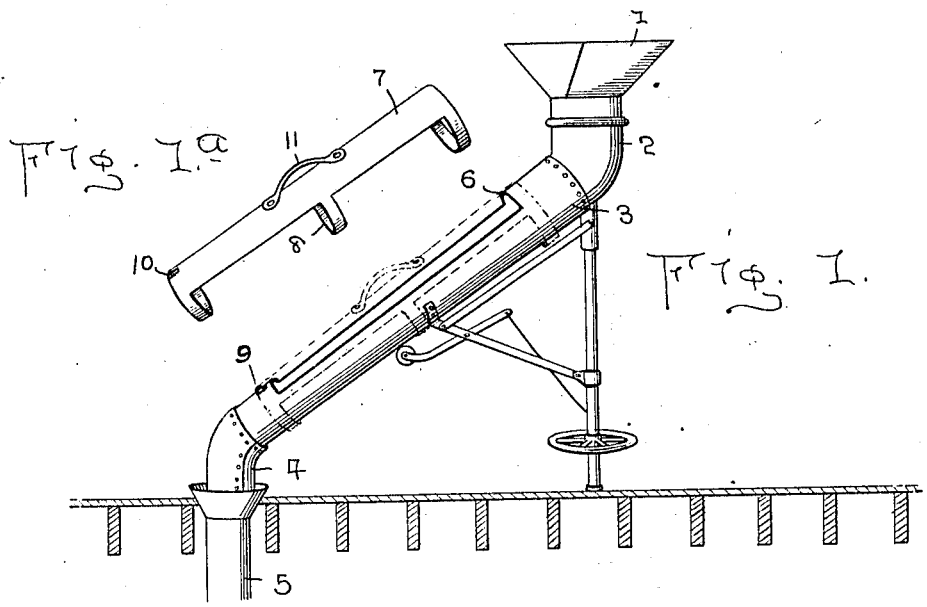
WITNESSES:
INVENTOR
A. W. Erickson
BY W. J. FitzGerald
Attorneys

UNITED STATES PATENT OFFICE.

AXEL W. ERICKSON, OF HAWICK, MINNESOTA.

SPOUT.

1,048,513.

Specification of Letters Patent. Patented Dec. 31, 1912.

Application filed December 20, 1911. Serial No. 666,907.

*To all whom it may concern:*

Be it known that I, AXEL W. ERICKSON, a citizen of the United States, residing at Hawick, in the county of Kandiyohi and State of Minnesota, have invented certain new and useful Improvements in Spouts; and I do hereby declare the following to be a full, clear, and exact description of the invention, such as will enable others skilled in the art to which it appertains to make and use the same.

My invention relates to new and useful improvements in spouts for grain elevators and more particularly to a closure for the side of a grain spout.

The object of my invention is to provide a grain spout having an opening in one side thereof and a closure adapted to normally close said opening.

A further object is to so form the closure that no projections will be disposed in the path of the grain discharged through said spout and which may be easily moved so that the opening in said spout will be disclosed when it is desired to remove obstacles in said spout.

Other objects and advantages of my invention will be hereinafter made clearly apparent in the specification and pointed out in the claims.

In the accompanying drawings I have shown the preferred forms which my invention may take.

In said drawings, Figure 1 is a perspective view of a spout for a grain elevator having an opening in one side thereof, the closure for said opening being shown in dotted lines. Fig. 1ª is a perspective view of the preferred form of closure for the opening in the side of a grain spout.

Referring to the drawings in which similar reference numerals designate corresponding parts throughout the several views, 1 is the hopper, into which the grain from the elevator is directed, said hopper being connected to a downwardly directed pipe 2. The lower end of the pipe 2 is connected to a preferably downwardly directed and obliquely disposed spout 3, which is of such a length as to extend to the point where it is desired to discharge the grain. The lower end of said pipe 3 is provided with a downwardly directed end 4, through which the grain is discharged into a suitable distributing pipe 5.

In handling grain it is usual to elevate the same to a high position in the building of the elevator, by means of endless conveyers having buckets or cups thereon to receive the grain. These buckets often become loose from the conveyer and are discharged with the grain into the hopper. With the usual form of grain spout these buckets or cups, and in fact other foreign objects which may be in the grain, will catch in the spout and prevent the passage of the grain therethrough. It is then necessary to remove the entire spout in order to remove the obstruction.

In employing my invention I form an opening 6 preferably in the upper side of the spout near its discharge end. A closure 7, of slightly greater extent than the opening 6, is disposed over said opening and is held in place by means of bands 8, which encircle the spout. In order to prevent the casual removal of the closure from the opening, the lower end of the spout is provided with an upwardly directed lug 9 and the lower end of the closure is provided with a notch 10, which is adapted to receive said lug. In order that the closure 7 may be easily moved when desired, I provide the same with a handle 11, which is riveted or otherwise rigidly secured thereto.

When it is desired to move the closure 7 from its normal position so as to disclose the opening in the side of the spout, the handle is grasped and the closure moved upwardly a sufficient distance to disengage the notch from the lug and said closure may then be turned around the spout until the opening is completely disclosed. The operator may then insert his arm in the spout or may insert any desired form of suitable tool therethrough to remove any obstruction from the spout.

From the foregoing description it will be seen that I have provided a grain spout, which may be easily cleaned whenever the same becomes clogged. It will also be seen that I have provided a form of closure which presents no form of obstruction to the passage of the grain through the spout.

While I have described my invention as being particularly adapted for use with a grain spout, I desire it to be understood that the same may be employed in connection with any form of distributing spout. I also desire it to be understood that certain modifications may be made therein without departing from the scope of my invention.

What I claim as new is:

1. In combination with an inclined cylindrical grain spout having an opening therein, a closure for the opening consisting of a curved body provided with circular bands movably embracing the cylindrical spout, said closure having a notch in an end thereof, a lug on the spout engaged by the said notch and held in engagement therewith by gravity for preventing rotation of the closure on the spout, and a handle on the closure whereby the closure may be moved longitudinally and the notch may be disengaged from the lug so that the closure may be rotated upon the surface of the spout for uncovering said opening.

2. In combination with an inclined cylindrical grain spout having an opening, a curved closure rotatably seated on the spout and adapted to be moved longitudinally thereof, locking means operating through gravity for preventing accidental relative movement of the spout and the closure, and a handle on the closure whereby it may be moved against gravity longitudinally of the spout and rotated thereon.

In testimony whereof I have signed my name to this specification in the presence of two subscribing witnesses.

AXEL W. ERICKSON.

Witnesses:
    E. A. SCHMITT,
    WILLARD E. SCHULTZ.

Copies of this patent may be obtained for five cents each, by addressing the "Commissioner of Patents Washington, D. C."